(12) United States Patent
Watanabe et al.

(10) Patent No.: US 9,436,898 B2
(45) Date of Patent: Sep. 6, 2016

(54) PRINTER AND PRINTER CONTROL METHOD

(71) Applicant: SEIKO EPSON CORPORATION, Tokyo (JP)

(72) Inventors: Ikumi Watanabe, Nagano (JP); Akemi Ito, Nagano (JP); Reiko Nomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 14/207,994

(22) Filed: Mar. 13, 2014

(65) Prior Publication Data

US 2014/0293330 A1 Oct. 2, 2014

(30) Foreign Application Priority Data

Mar. 27, 2013 (JP) ................................ 2013-065794

(51) Int. Cl.
*G06F 3/12* (2006.01)
*G06K 15/00* (2006.01)

(52) U.S. Cl.
CPC ......... *G06K 15/4065* (2013.01); *G06K 15/005* (2013.01)

(58) Field of Classification Search
None
See application file for complete search history.

(56) References Cited

U.S. PATENT DOCUMENTS

| 5,061,958 | A  | * | 10/1991 | Bunker et al. | ................... 399/81 |
| 6,817,794 | B2 | * | 11/2004 | Kakutani | ...................... 400/582 |
| 7,355,733 | B2 | * | 4/2008 | Sommer | ............ H04N 1/00408 358/1.14 |
| 8,120,792 | B2 | * | 2/2012 | Moro | ..................... G06K 15/00 358/1.13 |
| 2005/0248799 | A1 | * | 11/2005 | Takatsuna | .................... 358/1.13 |
| 2008/0044208 | A1 |   | 2/2008 | Motoyoshi | |
| 2014/0055815 | A1 | * | 2/2014 | Gabe | ............................ 358/1.15 |

FOREIGN PATENT DOCUMENTS

| CN | 101131552 A | 2/2008 |
| JP | 2006-205402 A | 8/2006 |
| JP | 2007-049314 A | 2/2007 |

* cited by examiner

*Primary Examiner* — Marivelisse Santiago Cordero
*Assistant Examiner* — Neil R McLean
(74) *Attorney, Agent, or Firm* — Global IP Counselors, LLP

(57) ABSTRACT

A printer includes a printing unit, a plurality of paper feeding units, a storage unit and a control unit. The printing unit is configured and arranged to execute printing based on a printing job. The paper feeding units are configured and arranged to supply paper to the printing unit. The storage unit is configured and arranged to correlate and store the paper feeding units and attributes of the paper held in the paper supply units. The control unit is configured to compare the attributes of the paper correlated with the paper feeding units with attributes of the paper specified with a printing job, and when there is no paper feeding unit for which the attributes correlated therewith is consistent with the attributes specified with the printing job, to display on a screen one of the paper feeding units in which to place the paper specified with the printing job.

6 Claims, 2 Drawing Sheets

PRINTER AND PRINTER CONTROL METHOD

CROSS-REFERENCE TO RELATED APPLICATIONS

This application claims priority to Japanese Patent Application No. 2013-065794 filed on Mar. 27, 2013. The entire disclosure of Japanese Patent Application No. 2013-065794 is hereby incorporated herein by reference.

BACKGROUND

1. Technical Field

The present invention relates to a printer and a printer control method.

2. Related Art

From the past, printers have been known for which when a mismatch error occurs in which the attributes of the paper held in a paper feeding unit and the attributes of the paper specified with a printing job do not match, exchanging of the paper is prompted, the attributes of the paper held in the paper feeding unit are correlated with the paper feeding unit, and the user is made to register that (for example, see Japanese Unexamined Patent Publication No. 2006-205402).

SUMMARY

However, with conventional printers, there was no confirmation of whether the attributes of the paper registered by the user after the mismatch error occurred matched the attributes of the paper actually held in the paper feeding unit.

A printer according to one aspect is configured and arranged to compare the attributes of paper correlated to a paper feeding unit to the attributes of paper specified with the printing job, and when there is no paper feeding unit for which those two attributes are consistent with each other, one of the paper feeding units on which to place the paper specified with the printing job is shown on the screen.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes of carrying out the invention while referring to the attached drawings. Note that for corresponding constitutional elements in each drawing, the same code numbers are given, and redundant descriptions will be omitted.

1. Printer Summary

Figure 1A:
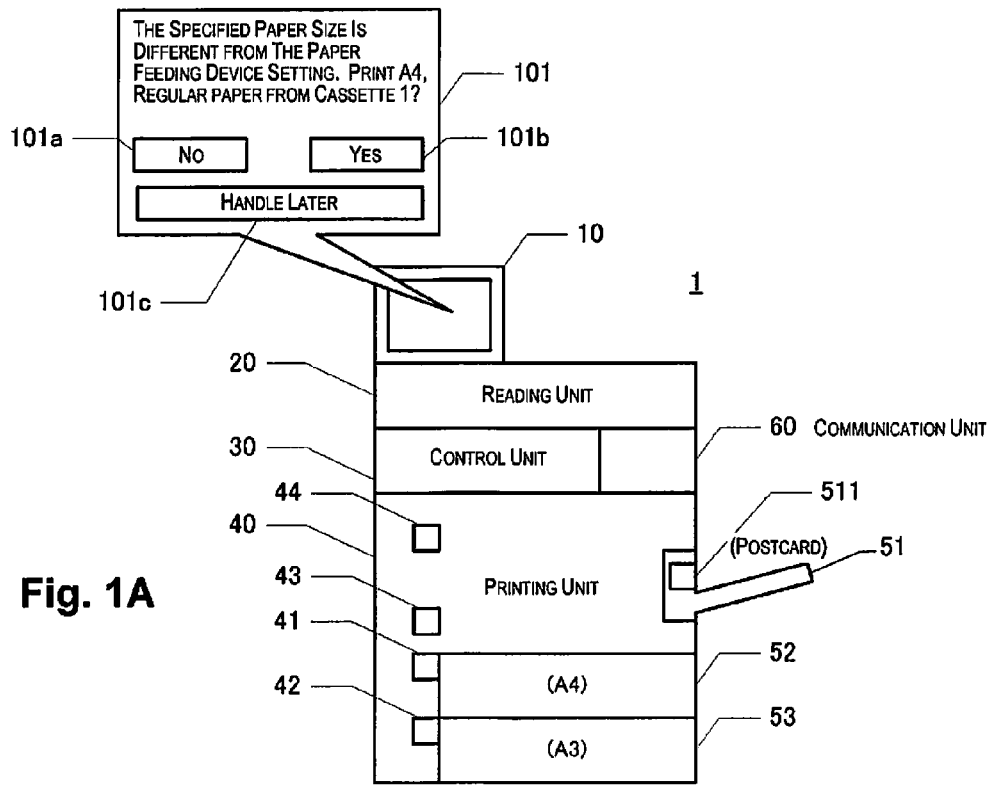
FIG. 1A is a block diagram of an embodiment of the present invention.

FIG. 1 shows a printer 1 as an embodiment of the present invention. The printer 1 is a compound machine equipped with a function for executing printing according to requests from an external device such as a PC (Personal Computer) or the like, a fax sending and receiving function, and a copying function, and is equipped with a display unit 10, a reading unit 20, a control unit 30, a communication unit 60, a printing unit 40, and paper feeding units 51, 52, and 53. The display unit 10 is a user interface for operating the printer 1, and is equipped with a touch panel. The reading unit 20 is a well known scanner for outputting to the control unit 30 the image data read from the original copy.

The printing unit 40 is a mechanism for forming an image on paper using a well known inkjet method, laser method or the like. The communication unit 60 is a mechanism for communication with an external device via a LAN (Local Area Network), telephone line, the internet or the like in compliance with a well known communication standard. The paper feeding units 51, 52, and 53 are mechanisms which each hold paper, and supply paper to the printing unit 40. The printing unit 40 is equipped with a paper width sensor 43 for detecting the width of the paper supplied from the paper feeding units 51, 52, and 53, and a paper length sensor 44 for detecting the length of that paper in the transport direction.

The paper feeding unit 51 is a well known multipurpose tray which is fixed to the printing unit 40 without being able to be inserted or removed. The multipurpose tray 51 is equipped with a sensor 511 for detecting whether or not paper is placed in the multipurpose tray 51. The multipurpose tray 51 has the surface for placing paper exposed, and is provided with a sliding type guide for holding paper of various sizes in the multipurpose tray 51.

The paper feeding units 52 and 53 are well known paper feeding cassettes that can be inserted in and removed from the printing unit 40. The paper feeding cassettes 52 and 53 can be stored in the storage chamber provided in the printing unit 40, and this has a box shape in which paper can be placed. Sliding type guides for holding paper of different sizes are also provided inside the paper feeding cassettes 52 and 53. The printing unit 40 is equipped with sensors 41 and 42 for detecting the insertion state and the removal state of the paper feeding cassettes 52 and 53 in the printing unit 40.

The control unit 30 is equipped with items that are not illustrated including a CPU, RAM as a volatile storage medium, an input/output mechanism, a non-volatile storage medium, an image processing ASIC (Application Specific Integrated Circuit) and the like, and the display unit 10, the reading unit 20, the communication unit 60, the printing unit 40, and the paper feeding units 51, 52, and 53 are controlled by executing the control program stored in the non-volatile storage medium, realizing functions such as printing, sending and receiving faxes, image reading, the user interface and the like.

2. Printer Control Method

Figure 2:
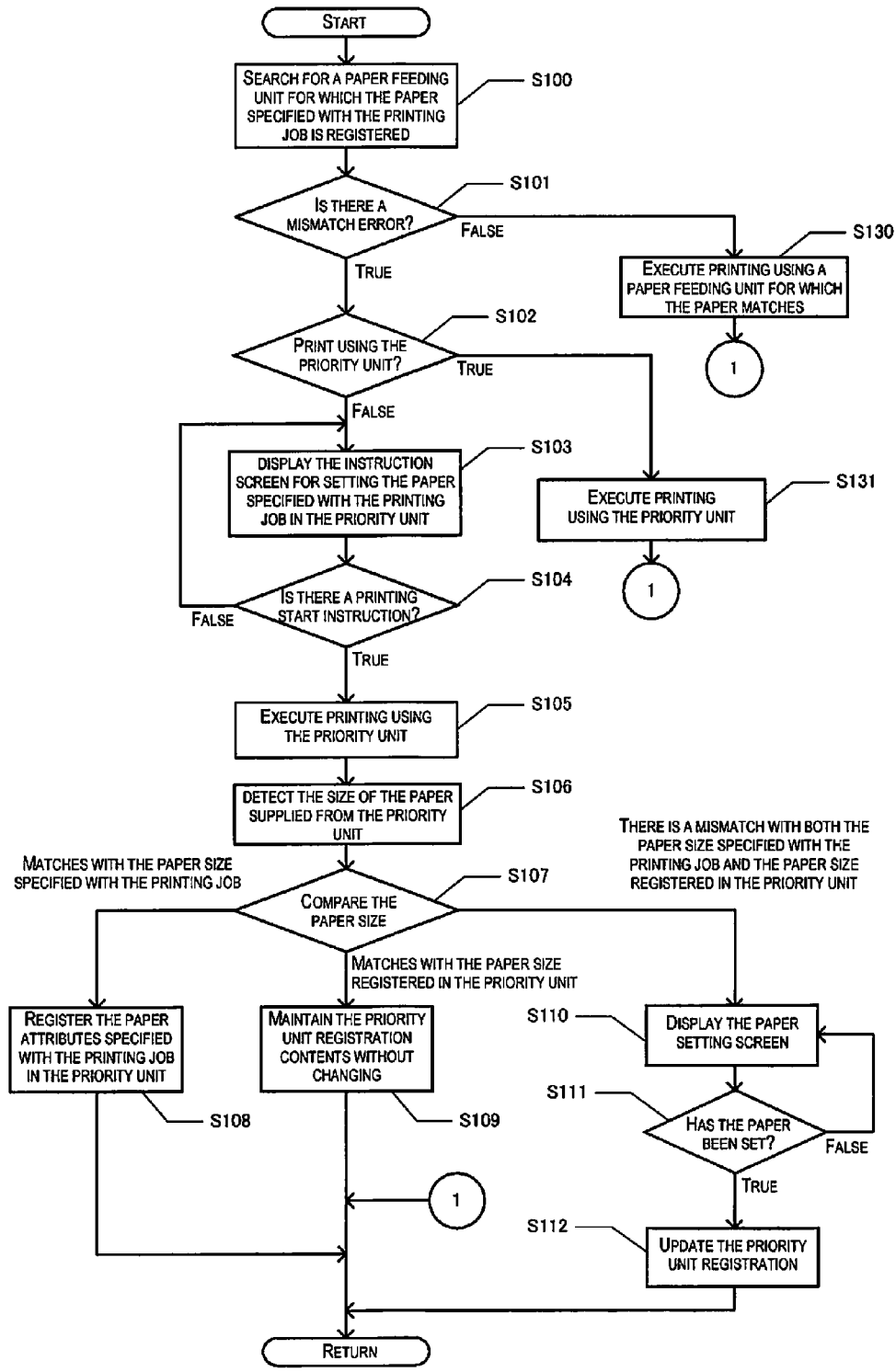
FIG. 2 is a flow chart of the embodiment of the present invention.

FIG. 2 shows the control sequence of the printer 1. The control sequence shown in FIG. 2 is activated by receiving a printing job from an external device such as a PC or the like. The user of the external device creates the printing job specifying the attributes of the printing paper, and sends the created printing job to the printer 1.

When the control unit 30 receives the printing job, it searches for a paper feeding unit for which paper of the attributes specified with the printing job are registered (S100). The attributes of the paper held in the paper feeding units 51, 52, and 53 are correlated to the respective paper feeding units 51, 52, and 53 and stored in the non-volatile memory medium of the control unit 30. The paper attributes include paper sizes of A5, A4, A3, and postcard, and paper qualities of regular paper, recycled paper, and photo paper. The control unit 30 correlates the attributes set by the user using the paper setting screen described later with the paper feeding units 51, 52, and 53, and stores these in the non-volatile memory medium.

The control unit 30 determines whether or not there is a paper feeding unit for which the correlated paper attributes match the attributes of the paper specified with the printing job match (S101), and when there is one, executes the printing job using the paper feeding unit to which are correlated the attributes of the paper matching the attributes of the paper specified with the printing job (S130).

When a mismatch error occurs for which there is no paper feeding unit to which are correlated paper attributes matching the attributes of the paper specified with the print job, the control unit 30 asks the user whether or not to print using a designated priority unit (S102). When printing using a priority unit is requested, the priority unit is selected as the paper feeding unit, and the printing job is executed using the priority unit (S131). The priority unit is the paper feeding unit that becomes the candidate to use with the printing job when a mismatch error occurs. With this embodiment, we will describe as the priority unit the paper feeding unit 41 for which paper exchange is easy, the user frequency is high, and the number of sheets which can be placed is high. The control unit 30 for example displays on the display unit 10 the mismatch error screen 101 shown in FIG. 1A, receives a printing request using the priority unit by selecting a Yes button 101b, and receives a request not to print using the priority unit by selecting a No button 101a.

Figure 1B:
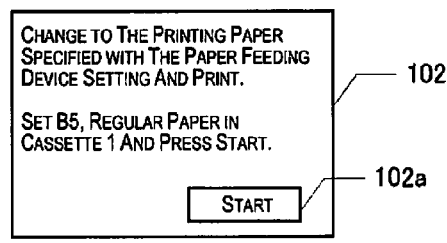
FIG. 1B and FIG. 1C are screen configuration diagrams of the embodiment of the present invention.

When it was requested to not print using the priority unit, the control unit 30 displays on the display unit 10 the instruction screen 102 shown in FIG. 1B and gives instructions on the attributes of the paper specified with the printing job and the priority unit for placing that paper (S103).

FIG. 1B shows the instruction screen 102 displayed when the paper feeding unit 41 identified as Cassette 1 is set as the priority unit, and B5 size regular paper is specified with the printing job. On the instruction screen 102, a Start button 102a is arranged for indicating printing start by the user selecting the paper of the displayed attributes after placing it in the displayed priority unit. The instruction screen 102 is displayed until the user selects the Start button 102a (S104).

When the control unit 30 receives printing start instructions after display of the instruction screen 102, the printing job is executed using the priority unit (S105). At this stage, the attributes of the paper correlated to the priority unit are maintained without changing to the attributes of the paper specified with the printing job. The attributes of the paper specified with the printing job are temporarily stored in the RAM of the control unit 30 until the paper attributes correlated to the priority unit and stored are established at steps S108, S109, and S110 described later.

During execution of the printing job, the control unit 30 detects the width of the paper using the paper width sensor 43, and detects the length of the paper using the paper length sensor 44 (S106).

The control unit 30 compares the paper size detected using the paper width sensor 43 and the paper length sensor 44, the paper size specified with the printing job, and the paper size registered to the priority unit (S107). At this time, a comparison is not done regarding paper quality, and when the paper size detected using the paper width sensor 43 and the paper length sensor 44 matches the paper size specified with the printing job, the attributes of the paper specified with the printing job and the paper attributes detected by the sensors are regarded as being consistent with each other.

When the paper size detected by the sensors matches the paper size specified with the printing job, the paper size and the paper quality specified with the printing job are registered in the priority unit (S108). Specifically, when the attributes of the paper specified with the printing job and the paper attributes detected by the sensors 43 and 44 are consistent with each other, all the paper attributes correlated to the paper feeding unit 52 which is the priority unit and stored in the non-volatile storage means are updated to the attributes of the paper specified with the printing job.

Here, the attributes detected using the sensors are only the paper size, and the paper quality is not detected. Therefore, there is no guarantee that the paper quality of the paper held in the priority unit will match the paper quality specified with the printing job. However, having a match between the paper size set with the printing job before a mismatch error occurs and the paper size actually used with the printing job executed after the mismatch error occurred means that the paper of the priority unit was exchanged after the occurrence of the mismatch error. Then, the instruction screen 102 displayed due to the occurrence of the mismatch error gives instructions to set paper of the paper quality specified with the printing job in the priority unit, so as long as the paper has been exchanged, the paper quality of the paper held in the priority unit after exchanging has a high probability of matching the paper quality specified with the printing job. In light of that, all of the paper attributes correlated to the paper feeding unit 52 which is the priority unit and stored in the non-volatile storage medium are updated to the attributes of the paper specified with the printing job. By doing this, it is possible to omit the trouble of the user setting the paper attributes.

When the paper size detected by the sensors and the paper size correlated with the priority unit and stored match, the control unit 30 maintains the paper attributes correlated with the priority unit and stored without changing them (S109). Specifically, when the attributes of the paper specified with the printing job and the paper attributes correlated with the priority unit and stored are consistent with each other, all of the paper attributes correlated with the priority unit and stored are maintained.

Here, there is no guarantee that the quality of the paper held in the priority unit will match the quality of the paper correlated with the priority unit and stored. However, having the paper size match before and after display of the instruction screen 102 means there is a high possibility that the paper of the priority unit has not been exchanged after display of the instruction screen 102. In light of that, all of the paper attributes correlated to the paper feeding unit 52 which is the priority unit and stored in the non-volatile storage medium are maintained without being updated. By doing this, it is possible to omit the trouble of the user setting the paper attributes.

Figure 1C:
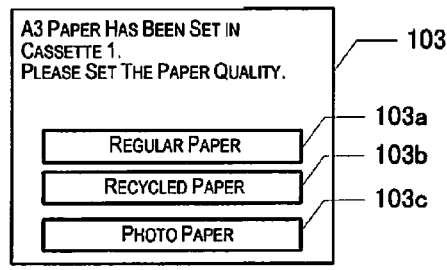

When the detected paper size does not match with the paper size specified with the printing job and also not with the paper size correlated to the priority unit and stored, the control unit 30 displays on the display unit 10 the paper setting screen 103 shown in FIG. 1C (S110). The control unit 30 displays on the paper setting screen 103 a Regular paper button 103a for setting regular paper, a Recycled paper button 103b for setting recycled paper, and a Photo paper button 103c for setting photo paper, and receives paper quality settings. Meanwhile, the paper size is already detected by the sensors, so the control unit 30 does not receive paper size settings with the paper setting screen 103.

The control unit 30 displays the paper setting screen 103 until one of the Regular paper button 103a, the Recycled paper button 103b, or the Photo paper button 103c is selected and the paper quality is set (S111).

When the paper quality is set, the control unit 30 updates the paper size correlated with the priority unit and stored in the non-volatile storage medium to the paper size detected by the sensors 43 and 44, and also updates the paper quality correlated to the priority unit to the paper quality set using the paper setting screen 103 (S112). As a result, the paper size detected by the sensors 43 and 44 and the paper quality explicitly set by the user are correlated with the priority unit, so there is a state for which there is guaranteed to be a match between the attributes of the paper held in the priority unit and the paper attributes correlated to the priority unit and stored.

As described above, the printer 1 updates the paper attributes correlated to the paper feeding unit and stored after confirming using the sensors whether the paper attributes registered by the user after the occurrence of a mismatch error match the attributes of the paper actually held in the paper feeding unit. Because of this, the printer 1 is able to match the attributes of the paper held in the paper feeding unit with the paper attributes correlated to the paper feeding unit and stored. Then, when the size of the paper held in the paper feeding unit after exchanging of the paper matches the paper size specified with the printing job, by the printer 1 regarding the paper quality which cannot be detected by the sensors as matching the paper quality specified with the printing job as well, the paper setting operation by the user is omitted. Therefore, the printer 1 is able to prevent the problem of the user being forced to input paper attributes unnecessarily. Also, since when a mismatch error occurs, the printer 1 instructs the user on the paper feeding unit in which to place the paper of the new attributes and the attributes of the paper to be placed, it is possible to prevent the problem of having the paper of the paper feeding unit being exchanged when it is not desirable for the paper to be exchanged

3. Other Embodiments

Moreover, the technical scope of the present invention is not limited by the embodiments described above, and of course it is possible to add various changes within a scope that does not stray from the gist of the present invention.

For example, the multipurpose tray can also be used as the priority unit. This is because though it allows only a small number of paper sheets to be stacked, the multipurpose tray is the easiest for replacing paper because it is exposed. Also, the control unit can select the priority unit on a case by case basis. For example, it is possible to select as the priority unit a paper feeding unit for which paper of a size larger than the paper size specified with the printing job is registered, to select as the priority unit a paper feeding unit for which no paper is placed, or to exclude from the priority unit a paper feeding unit for which expensive paper such as photo paper or thick paper or the like are registered.

Also, for example, it is possible to provide a sensor for detecting the paper width and length attributes before printing. For example, it is also possible to detect the paper width and length by the sensor detecting the position of the sliding type guide equipped in the paper feeding unit, to display the paper setting screen before starting printing, and to update the paper attributes before starting printing.

Also, for example, it is possible to apply the present invention to attributes such as paper thickness or the like, in addition to paper size and paper quality. Also, for example, it is possible to receive explicit printing start instructions by a button operation after display of the instruction screen, or to receive insertion after removal of the paper feeding unit as the printing start instructions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer comprising:
   a print mechanism that executes printing based on a printing job;
   a plurality of paper feeders that supplies paper to the print mechanism;
   a memory that correlates and stores the paper feeders and attributes of the paper held in the paper feeders;
   a controller that compares the attributes of the paper correlated with the paper feeders with attributes of the paper specified with a printing job to detect a mismatch error in which there is no paper feeder for which the attributes correlated therewith is consistent with the attributes specified with the printing job, and to display on a screen one of the paper feeders in which to place the paper specified with the printing job when the mismatch error is detected; and
   a sensor that detects paper sizes including paper widths and paper lengths among the attributes of the paper supplied to the print mechanism, wherein
   the controller further detects the attributes of the paper actually held in the one of the paper feeders, and compares the attributes of the paper actually held in the one of the paper feeders with the attributes of the paper specified with the printing job after the mismatch error is detected, and
   the controller further
      updates the attributes of the paper correlated to the one of the paper feeders to the attributes of the paper specified with a first printing job, when the paper sizes of the paper detected by the sensor and the paper sizes of the paper specified with the first printing job match, does not update the attributes of the paper correlated to the first paper feeder, when the paper sizes of the paper detected by the sensor and the paper sizes of the paper specified with a second printing job do not match, and the paper sizes of the paper detected by the sensor and the paper sizes stored in the memory match, and does not update the attributes of the paper correlated to the one of the paper feeders and displays on a screen the attributes of the paper specified with the printing job, when the paper sizes of the paper detected by the sensor and the paper sizes of the paper specified with a third printing job do not match, and the paper sizes of the paper detected by the sensor and the paper sizes stored in the memory do not match.

2. The printer according to claim 1, wherein
the sensor detects a portion of the attributes of the paper supplied to the print mechanism, and
when the controller compares a portion of the attributes of the paper detected by the sensor and the attributes of the paper specified with the printing job, and the two attributes are consistent with each other, the controller updates all the attributes of the paper correlated to the one of the paper feeders used with the printing job to the attributes of the paper specified with the printing job.

3. The printer according to claim 2, wherein
when the portion of the attributes of the paper detected by the sensor and the attributes of the paper specified with the printing job are not consistent with each other, the controller displays a paper setting screen for setting at least a remaining part of the attributes of the paper detected by the sensor, and to update a portion of the attributes of the paper correlated to the one of the paper feeders used with the printing job to the portion of the attributes detected by the sensor, and to also update a remaining part of the attributes correlated to the one of the paper feeders used with the printing job to the remaining part of the attributes set using the paper setting screen.

4. The printer according to claim 3, wherein
the sensor detects the paper size as the portion of the attributes of the paper, and
the controller displays the paper setting screen for setting a paper quality as at least a portion of the remaining part of the attributes of the paper.

5. The printer according to claim 1, wherein
the memory is a non-volatile storage medium, and
the controller includes a volatile storage medium that temporarily stores the attributes of the paper displayed on an instruction screen until the attributes are updated to the attributes of the paper correlated to the one of the paper feeders.

6. The printer according to claim 1, wherein
when the one of the paper feeders executes printing based on a specified fourth printing job after the first printing job, the controller compares the attributes of the paper specified with the fourth printing job with the attributes of the paper updated by the first printing job, when the one of the paper feeders executes printing based on the specified fourth printing job after the second printing job, the controller compares the attributes of the paper specified with the fourth printing job with the attributes of the paper not updated by the second printing job and stored in the memory, and when the one of the paper feeders executes printing based on the specified fourth printing job after the third printing job, the controller compares the attributes of the paper specified with the fourth printing job with the attributes of the paper not updated by the third printing job and updated after displaying on the screen.

\* \* \* \* \*